Jan. 13, 1931.  F. L. LUNT  1,788,436
FOLDING WINDSHIELD
Filed June 21, 1930

INVENTOR
Fred L. Lunt
BY
ATTORNEYS

Patented Jan. 13, 1931

1,788,436

UNITED STATES PATENT OFFICE

FRED L. LUNT, OF YPSILANTI, MICHIGAN

FOLDING WINDSHIELD

Application filed June 21, 1930. Serial No. 462,747.

The present invention pertains to a novel windshield of a type especially designed for motor boats and the like.

The primary object of the present invention is to devise a windshield for use on motor boats that will afford protection to the occupants of the boat when the windshield is in its normal position and which may be folded to a position where it lies in close proximity to the forward deck and having means for securely holding it in that position when it is desirable to reduce the wind resistance for traveling at a high rate of speed.

With the above and other ends in view, the present invention consists of matters hereinafter set forth and more particularly pointed out in the appended claims, reference being had to the accompanying drawing, in which—

Like reference characters are used to designate like parts throughout the following specification.

Figure 1:
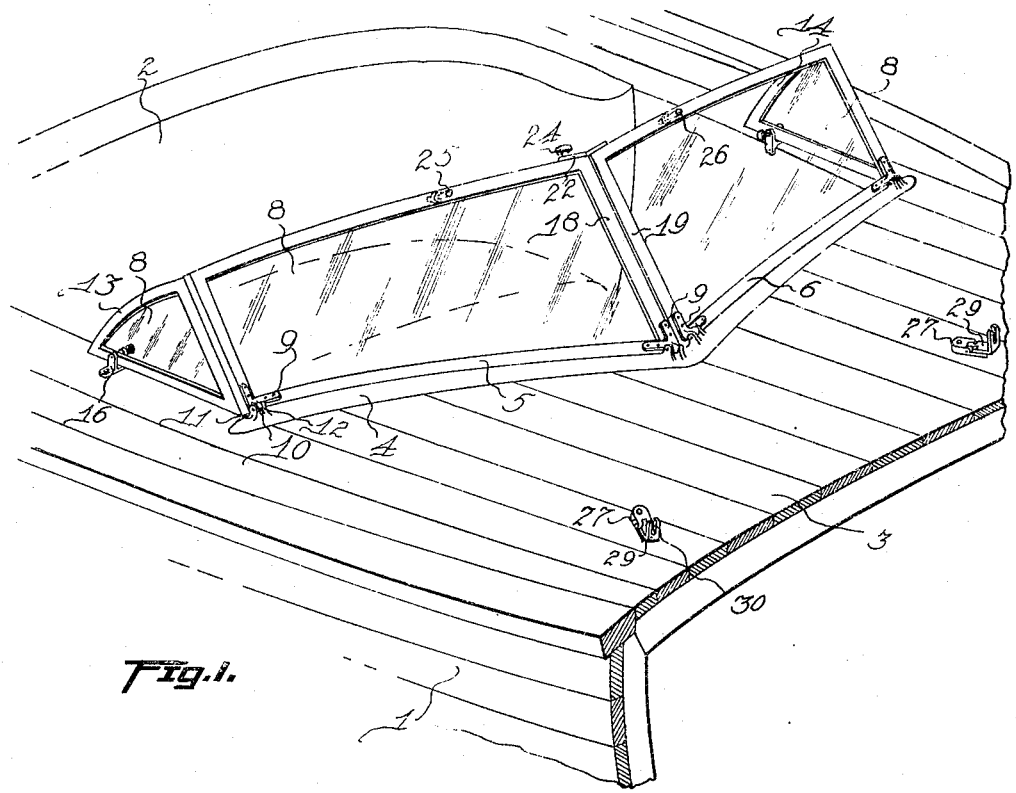
Figure 1 is a fragmentary view of a motor boat, showing a device embodying the present invention mounted thereon.

In Figure 1 the numeral 1 designates a motor boat hull having a cockpit 2 and a forward deck 3. Mounted upon the deck 3 immediately forward of the cockpit 2 is a base molding 4 shaped in plan view in the form of a broad V extending across the deck, the full width of the cockpit. Windshield frames 5 and 6 are inwardly grooved as at 7 to receive the edges of plate glass panels 8, and secured to the lower corners of each of these frames are angle plates 9 having ears 10 which are pivotally mounted between and connected to ears 11 and 12 on the molding or base strip 4, thus providing independent pivotal connection of these frames to the base strip and deck.

Side or end wing frames 13 and 14, also provided with plate panels, are secured to the outer ends of said frames 5 and 6, each by means of a piano hinge 15 extending the full length of the joined frame ends. When the windshield is in operative or up position, the lower edges of the side wings 13 and 14 fit into U-shaped fittings 16 secured to the deck 3 adjacent the edge of the cockpit 2. Extending through one side of each U-fitting 16, is a thumb screw 17, which, when turned in against the lower side of each of the side wings 13 and 14 will hold the whole windshield in its extended or operative position due to the rearwardly extending angular position of these wings to the main frames.

Figure 2:
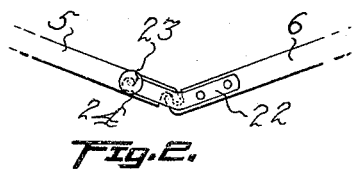
Fig. 2 is a plan view of a portion of a windshield showing means for securing adjacent ends of separate parts of the windshield together when in their raised position.
Figure 4:
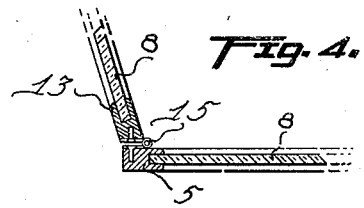
Fig. 4 is a cross sectional detail showing the hinge connection of a side wing to an end of a windshield frame.
Figure 3:
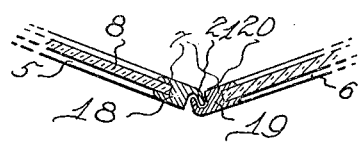
Fig. 3 is a cross section of Figure 2, showing interlocking means on the adjacent ends of the windshield frames.
Figure 5:
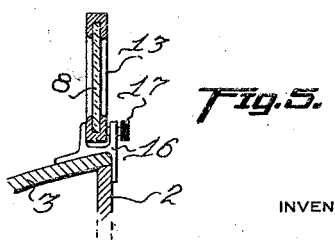
Fig. 5 is a vertical section through a side wing of the shield, illustrating means for securing the wing to the deck when the shield is in raised position.
Figure 6:
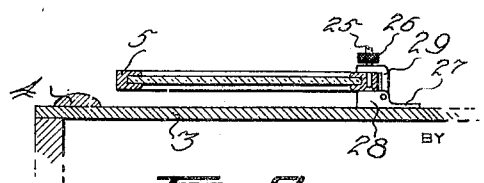
Fig. 6 is a vertical cross section through one frame of the windshield, showing the same in folded position and means for securing it to the forward deck in folded position.

To provide a tight or weatherproof joint between the end members 18 and 19 of the frames 5 and 6, these members are formed to interlock in the extended position of the shield, said member 18 being formed with a groove 20 extending the full length of said member and the member 19 with a like groove providing a projecting edge flange 21 to engage and seat within the said groove 20. These adjacent ends of the frames 5 and 6 thus interlock in an overlapping relation, forming a closed joint when the shield is in operative position. To secure these adjacent ends of these main frames together and interlocked, a strap 22 shown in Figure 2, is secured at one end to the end edge of the frame 6, and is bent to conform to the angular relation of said frames which are detachably connected by the strap by providing a notch 23 at the opposite end of said strap to receive a screw, bolt or thumb nut 24, for detachably and rigidly securing the frames together at their meeting angle.

Upon the upper edge of each frame 5 and 6 is a screw or bolt extending transversely through the frame member and having a nut or head 26, thus providing a thumb screw which, when the windshield is in folded position, will engage hold-down brackets 27 secured upon the deck 3 at the proper distance forwardly of the base or molding 4 to which each frame is pivotally attached at its lower edge. Each of these hold-down brackets 27 consists of a base formed with a raised portion 28 at one end which provides a seat for the upper member of the frame, when in turned down position, and to one end of which raised seat is pivotally attached an L-shaped latch or member 29 which is slotted inwardly from its free end as at 30 to receive the bolt 25 when said latch member is swung on its pivotal attachment to the base to bring its free end over the frame and beneath the head or thumb nut 26 which may then be turned down hard against the latch and rigidly but detachably hold the frame in folded position.

Although a specific embodiment of the invention has been illustrated and described, it is to be understood that various changes in details of construction may be made without departing from the scope of the invention, as set forth in the appended claims, and such changes are contemplated.

What I claim is:

1. The combination of a plurality of abutting angularly disposed windshield frames pivotally supported at their lower edges, said frames having abutting ends adapted to interlock.

2. In a windshield, the combination of a plurality of end abutting angularly disposed windshield frames pivotally supported at their lower edges, a pair of end wings hinged to the ends of said frames, and means for detachably holding said wings against pivotal movement and in angular relation to said main frames to support and brace said frame in operative position.

3. The combination with a boat deck of a plurality of end abutting, angularly disposed windshield frames, means on the lower portions of said frames for pivotally securing said frames to said deck with said frames in rearwardly inclined position and permitting said frames to be turned forwardly to a position substantially parallel with and in close proximity to said deck, and means for detachably holding said frames in the position to which they are turned.

4. The combination with a boat deck, of a plurality of angularly disposed and rearwardly inclined windshield frames, means for pivotally securing said frames at their lower edges to said deck, and means on the ends of said frames adapted to interlock when said frames are in operative position.

5. The combination with a boat deck, a pair of angularly disposed windshield frames, means for pivotally attaching said frames at their lower edges to said deck, members on the adjacent ends of said frames adapted to interlock when said frames are in operative position extending upwardly and in a rearwardly inclined position, wings pivotally connected to the outer ends of said frames, and means for detachably attaching said wings at their lower edges to said deck in angular relation to said frames to brace the same.

6. A windshield comprising a pair of angularly disposed and laterally inclined windshield frames, means for pivotally attaching each frame at its lower edge to a supporting member for swinging movement independently of the other, said frames extending in relative angular relation in the direction of their length, means on the adjacent ends of said frames adapted to interlock, whereby one frame supports the other frame in the angular position of said frames, and a wing pivotally attached to the outer end of each frame to extend angularly thereto and to brace the same.

In testimony whereof I affix my signature.

FRED L. LUNT.